United States Patent
Higashiyama et al.

(10) Patent No.: US 12,425,530 B2
(45) Date of Patent: Sep. 23, 2025

(54) IMAGE PROCESSING DEVICE, IMAGE PROCESSING METHOD, AND STORAGE MEDIUM

(71) Applicant: CANON KABUSHIKI KAISHA, Tokyo (JP)

(72) Inventors: Teruyuki Higashiyama, Kanagawa (JP); Ikunari Nakahara, Kanagawa (JP); Keisuke Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 18/181,118

(22) Filed: Mar. 9, 2023

(65) Prior Publication Data
US 2023/0308598 A1    Sep. 28, 2023

(30) Foreign Application Priority Data
Mar. 28, 2022    (JP) .................. 2022-052234

(51) Int. Cl.
*H04N 5/262* (2006.01)
*G06T 7/13* (2017.01)
*G06T 7/60* (2017.01)

(52) U.S. Cl.
CPC ............. *H04N 5/2624* (2013.01); *G06T 7/13* (2017.01); *G06T 7/60* (2013.01); *H04N 5/2628* (2013.01)

(58) Field of Classification Search
CPC .. H04N 5/2624; H04N 5/2628; H04N 23/951; H04N 5/265; H04N 7/181; H04N 23/90; G06T 7/13; G06T 7/60; G06T 11/60; G06T 3/4038; G06T 3/608; G06T 5/50; B60R 1/24; B60R 1/26; B60R 2300/304; B60R 2300/607; B60R 11/04; B60W 40/02; B60W 2050/0005; B60W 2420/403; B60Y 2200/148; B60Y 2200/415
See application file for complete search history.

(56) References Cited

U.S. PATENT DOCUMENTS

| | | | |
|---|---|---|---|
| 2010/0171828 A1* | 7/2010 | Ishii | H04N 7/183 348/135 |
| 2013/0236858 A1* | 9/2013 | Lin | G09B 9/042 434/66 |
| 2014/0085472 A1* | 3/2014 | Lu | B60R 1/26 348/148 |

(Continued)

FOREIGN PATENT DOCUMENTS

| | | | | |
|---|---|---|---|---|
| EP | 2712969 A1 * | 4/2014 | | B60R 1/00 |
| JP | 2019-216380 A | 12/2019 | | |

OTHER PUBLICATIONS

Jul. 14, 2023 European Official Action in European Patent Appln No. 23160386.1.

*Primary Examiner* — Henok Shiferaw
*Assistant Examiner* — Woo C Rhim
(74) *Attorney, Agent, or Firm* — Venable LLP

(57) ABSTRACT

An image processing device includes an angle detection unit configured to detect an angle between a front portion of a movable apparatus and a rear portion of the movable apparatus, a combining unit configured to combine an image captured by a front portion imaging unit provided at the front portion and an image captured by a rear portion imaging unit provided at the rear portion, and a boundary calculation unit configured to calculate a boundary between the images combined in the combining unit on the basis of the angle.

20 Claims, 12 Drawing Sheets

(56) References Cited

U.S. PATENT DOCUMENTS

| | | | |
|---|---|---|---|
| 2014/0088824 A1* | 3/2014 | Ishimoto | E02F 9/0841 |
| | | | 348/148 |
| 2014/0267688 A1* | 9/2014 | Aich | B60W 30/00 |
| | | | 348/113 |
| 2015/0286878 A1* | 10/2015 | Molin | B60R 1/27 |
| | | | 348/148 |
| 2016/0049020 A1* | 2/2016 | Kuehnle | G07C 5/0841 |
| | | | 701/34.4 |
| 2017/0374287 A1* | 12/2017 | Lang | B60R 1/25 |
| 2020/0010018 A1* | 1/2020 | Maruoka | B60R 1/003 |
| 2022/0144187 A1* | 5/2022 | Sperrle | B60W 30/06 |
| 2022/0180488 A1* | 6/2022 | Nakagawa | B60R 1/27 |
| 2022/0215670 A1* | 7/2022 | Gali | G06V 10/48 |
| 2023/0308598 A1* | 9/2023 | Higashiyama | G06T 3/4038 |
| 2024/0331193 A1 | 10/2024 | Klinger | |
| 2024/0412410 A1* | 12/2024 | Klinger | G06T 7/75 |

* cited by examiner

IMAGE PROCESSING DEVICE, IMAGE PROCESSING METHOD, AND STORAGE MEDIUM

BACKGROUND OF THE INVENTION

Field of the Invention

The present invention relates to an image processing device, an image processing method, and a storage medium.

Description of the Related Art

In recent years, there have been driving support devices that display videos of the surroundings with a camera installed on a so-called articulated vehicle, which is a vehicle such as a trailer or a wheel loader that bends at a joint.

Japanese Patent Laid-Open No. 2019-216380 discloses a driving support device that monitors the surroundings of a connected vehicle. A configuration is disclosed in which a bird's-eye view image generated through viewpoint conversion of images captured by a plurality of cameras provided on a tractor and a bird's-eye view image generated through viewpoint conversion of images captured by a plurality of cameras provided on a trailer connected to the tractor are combined.

However, in the above driving support device, there is an issue that when a bending angle between the tractor and trailer changes, there is a region that cannot be displayed at the joint in a bird's-eye view image.

SUMMARY OF THE INVENTION

An image processing device of one aspect of the present invention includes at least one processor or circuit configured to function as an angle detection unit configured to detect an angle between a front portion of a movable apparatus and a rear portion of the movable apparatus; a combining unit configured to combine an image captured by a front portion imaging unit provided at the front portion and an image captured by a rear portion imaging unit provided at the rear portion; and a boundary calculation unit configured to calculate a boundary between the images combined in the combining unit on the basis of the angle.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
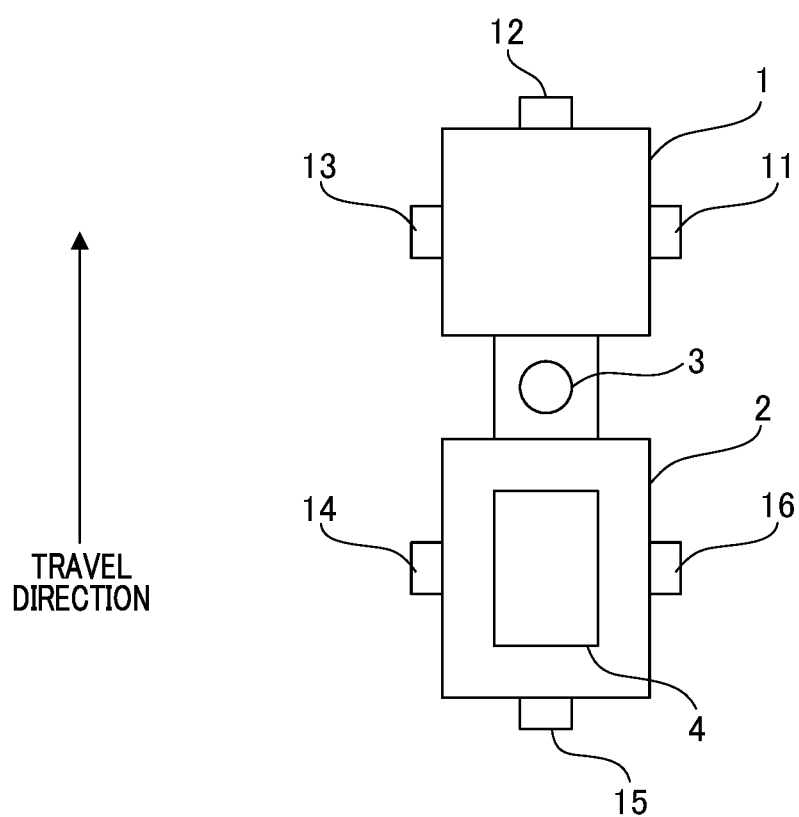
FIG. 1 is a diagram illustrating a positional relationship between an imaging unit and a vehicle in a First Embodiment.

A First Embodiment will be described by using FIGS. 1 to 9. FIG. 1 is a diagram for describing a positional relationship between an imaging unit and a vehicle of the First Embodiment. In FIG. 1, the reference numeral 1 denotes a vehicle front portion, the reference numeral 2 denotes a vehicle rear portion, and the vehicle front portion 1 and the vehicle rear portion 2 are connected via a connecting portion 3. The vehicle front portion 1 and the vehicle rear portion 2 are rotatable around the connecting portion 3.

The reference numeral 4 denotes a cab, which is installed in the vehicle rear portion 2, and the cab 4 is provided with a driver's seat and various operation units. The operation units include a steering wheel, and when a driver operates the steering wheel, the vehicle front portion 1 and the vehicle rear portion 2 are bent at the connecting portion 3.

Cameras 11, 12, and 13 are installed on the right, front, and left sides of the vehicle front portion 1, and cameras 14, 15, and 16 are installed on the left, rear, and right sides of the vehicle rear portion 2. The cameras 11 to 13 are respectively installed to cover the right side, the front side, and the left side of the vehicle front portion 1.

Similarly, the cameras 14 to 16 are respectively installed to cover the left side, the rear side, and the right side of the vehicle rear portion 2. Optical axes of optical systems of the cameras 11 to 16 are provided to be substantially horizontal if the vehicle is placed on a horizontal plane.

In the First Embodiment, the cameras 11 to 16 have substantially the same configuration, each having an imaging element and an optical system that forms an optical image on a light receiving surface of the imaging element. The optical systems of the cameras 11 to 16 used in the First Embodiment are fisheye lenses or wide-angle lenses capable of capturing a wide range of surroundings.

Next, a configuration of the image processing device in the First Embodiment will be described using FIG. 2.

Figure 2:
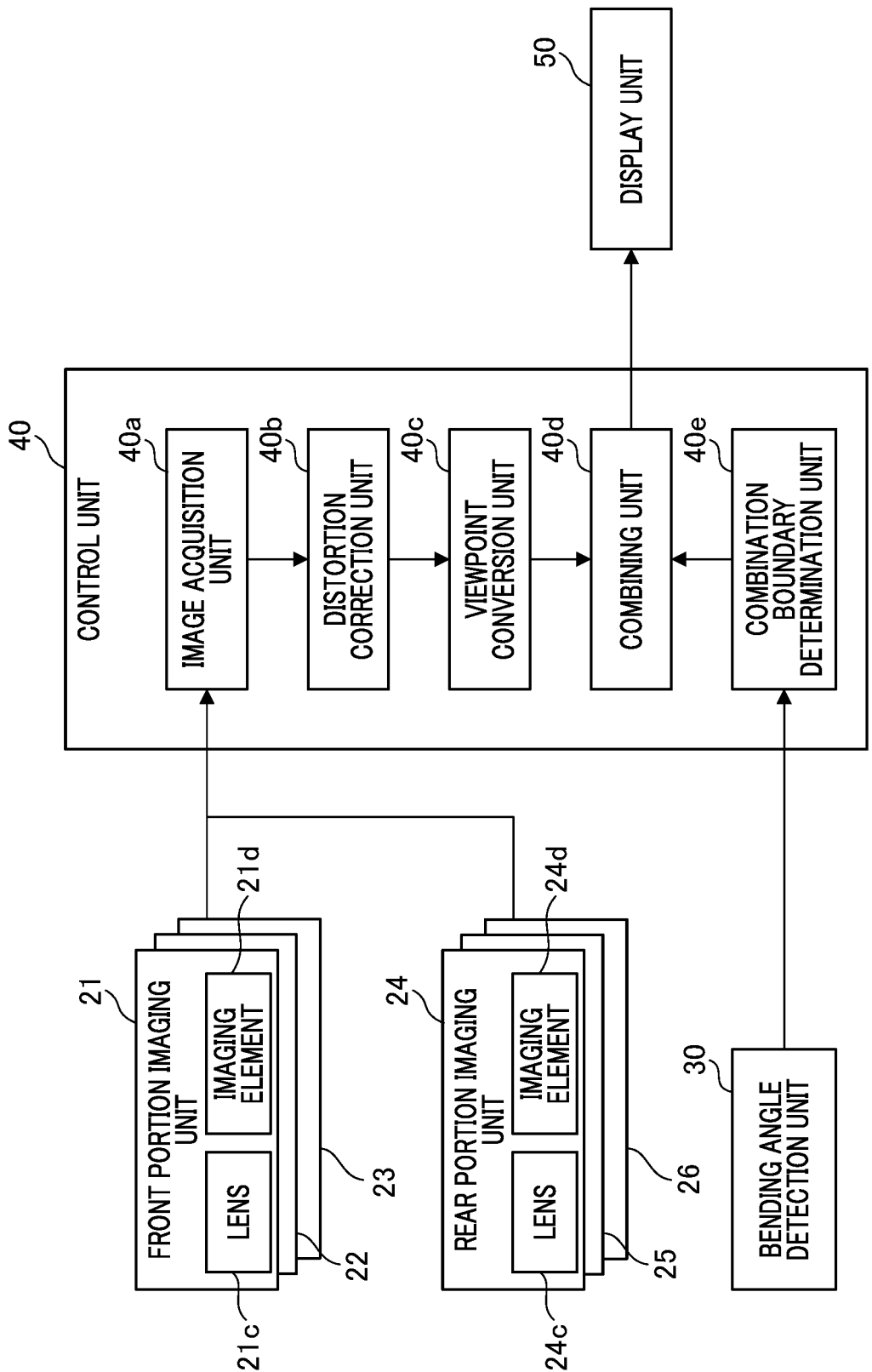
FIG. 2 is a functional block diagram for describing a configuration of an image processing device in the First Embodiment.

FIG. 2 is a functional block diagram for describing a configuration of the image processing device in the First Embodiment. Some of the functional blocks shown in FIG. 2 are realized by causing a computer (not shown) included in the image processing device to execute a computer program stored in a memory (not shown) as a storage medium.

However, some or all of the functional blocks may be realized by hardware. As hardware, a dedicated circuit (ASIC), a processor (a reconfigurable processor or a DSP), or the like may be used. Each functional block shown in FIG. 2 may not be built in the same casing, and may be configured by separate devices connected to each other via signal paths.

In FIG. 2, an image processing device 100 is mounted on a vehicle as a movable apparatus, and imaging units 21 to 26 are respectively disposed in the housings of the cameras 11 to 16. Here, the imaging units 21 to 23 correspond to front portion imaging units, and the imaging units 24 to 26 correspond to rear portion imaging units.

The imaging units 21 to 26 respectively have lenses 21c to 26c and imaging elements 21d to 26d such as CMOS image sensors or CCD image sensors. The lenses 21c to 26c as optical systems are configured with one or more optical lenses, and form optical images on the light receiving surfaces of the imaging elements 21d to 26d, respectively. The imaging elements 21d to 26d function as imaging units, photoelectrically convert optical images, and output imaging signals.

The reference numeral 30 denotes a bending angle detection unit, which detects a bending angle between the vehicle front portion 1 and the vehicle rear portion 2. The bending angle detection unit 30 is configured with a sensor such as an encoder provided in or around the connecting portion 3 that connects the vehicle front portion 1 and the vehicle rear portion 2. Here, the bending angle detection unit 30 functions as an angle detection unit that detects an angle formed by a front portion of a movable apparatus and a rear portion of the movable apparatus.

The reference numeral 40 denotes a control unit, and includes a system on chip (SOC)/field programmable gate array (FPGA) (not shown), a buffer memory, a CPU as a computer, a memory as a storage medium, and the like.

The control unit 40 may have a processor specialized for image processing, such as a GPU. The control unit 40 controls an operation of each unit of the entire device on the basis of the computer program stored in the memory. In the First Embodiment, the control unit 40 is accommodated in a casing separate from the camera.

The control unit 40 or a display unit 50 in the image processing device 100 may be provided at a position away from the movable apparatus, and in this case, an image may be acquired from the imaging unit by a communication unit to be subjected to image processing.

An image acquisition unit 40a acquires respective image signals from the imaging units 21 to 26. The image acquisition unit 40a reads an image signal of 60 frames per second, for example.

A distortion correction unit 40b corrects distortion of an image acquired by the image acquisition unit 40a. Distortion correction is a process of correcting distortion of the lenses 21c to 26c. By correcting the distortion, it is possible to combine a plurality of images captured by the fisheye/wide-angle lenses with large distortion.

A viewpoint conversion unit 40c converts a viewpoint of an image acquired by the image acquisition unit 40a or converts a viewpoint of a captured image, and generates a bird's-eye view image. In the First Embodiment, the optical axes of the cameras 11 to 16 are approximately horizontal, and thus the viewpoint of the image acquired by the image acquisition unit 40a is also approximately horizontal. Therefore, in the viewpoint conversion unit 40c, for example, the image is converted into an image with a virtual viewpoint looking down from directly above the vehicle front portion 1 and the vehicle rear portion 2.

A combining unit 40d combines six viewpoint-converted images that are images with viewpoints looking down from directly above the vehicle front portion 1 and the vehicle rear portion 2, obtained through conversion in the viewpoint conversion unit 40c on the basis of a combination boundary determined by a combination boundary determination unit 40e to generate a bird's-eye view image. Here, the combining unit 40d combines images captured by the front portion imaging units provided at the front portion and images captured by the rear portion imaging units provided at the rear portion.

The combination boundary determination unit 40e functions as a boundary calculation unit that determines a boundary (joint) to be combined when six images are combined by the combining unit 40d, calculates a boundary of images to be combined in the combining unit on the basis of a bending angle. A method of determining this combination boundary will be described in detail with reference to FIGS. 4 to 8. The reference numeral 50 denotes a display unit that includes a display element such as a liquid crystal display and displays a combined image or the like.

Figure 3:
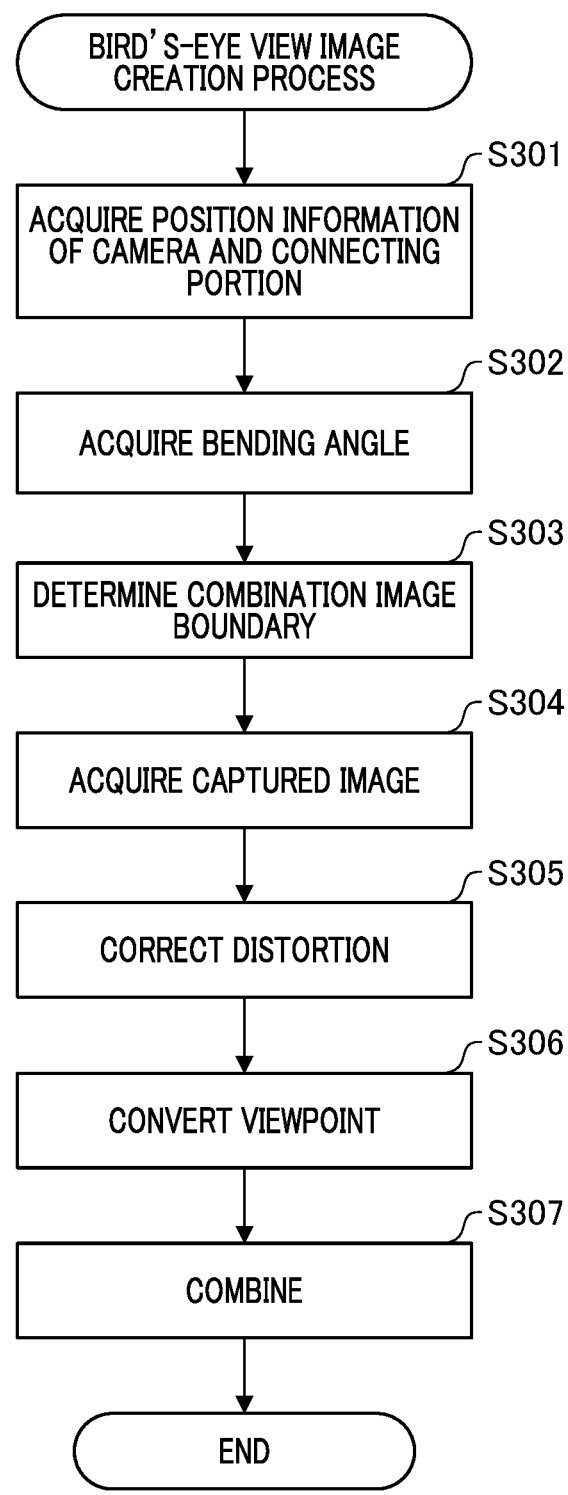
FIG. 3 is a flowchart for describing a series of operations of a control unit 40.

FIG. 3 is a flowchart for describing a series of operations of the control unit 40. The operation in each step in the flowchart of FIG. 3 is performed by executing the computer program stored in the memory by the CPU as a computer in the control unit 40.

In step S301, the CPU of the control unit 40 acquires positions of the cameras 11 to 16 and a position of the connecting portion 3. These values are coordinate values with respect to the vehicle and are fixed values, are stored in a memory in advance, and are acquired by reading position information from the memory.

Next, the process proceeds to step S302, in which the CPU of the control unit 40 acquires a bending angle between the vehicle front portion 1 and the vehicle rear portion 2 from the bending angle detection unit 30. The bending angle is acquired by reading a value of a sensor such as an encoder provided in the bending angle detection unit 30. Here, step S302 functions as an angle detection step for detecting an angle formed between a front portion of a movable apparatus and a rear portion of the movable apparatus.

Next, the process proceeds to step S303 (boundary calculation step), in which the CPU of the control unit 40 determines a combination boundary from the positions (coordinates with respect to the vehicle) of the cameras 11 to 16 and the connecting portion 3 acquired in step S301 and the bending angle acquired in step S302. Details of the combination boundary determination process in this step S303 will be described later with reference to FIGS. 4 to 8.

Next, the process proceeds to step S304, in which the CPU of the control unit 40 stores the six image signals obtained from the imaging units 21 to 26 in a buffer memory (not shown). Next, in step S305, the CPU of the control unit 40 corrects lens distortion for all of the acquired six image signals. Distortion correction is performed according to the characteristics of the lenses 21c to 26c provided in the imaging units.

Next, the process proceeds to step S306, in which the CPU of the control unit 40 converts viewpoints of the six image signals that have undergone distortion correction in step S305, and thus converts the images into images looking down from above the vehicle front portion 1 and the vehicle rear portion 2.

Next, the process proceeds to step S307, in which the CPU of the control unit 40 combines the six images of which the viewpoints have been converted in step S305, and ends the bird's-eye view image creation process. Here, step S307 functions as a combination step of combining images captured by the imaging units provided at the front portion and images captured by the rear portion imaging units provided at the rear portion.

Figure 4A:
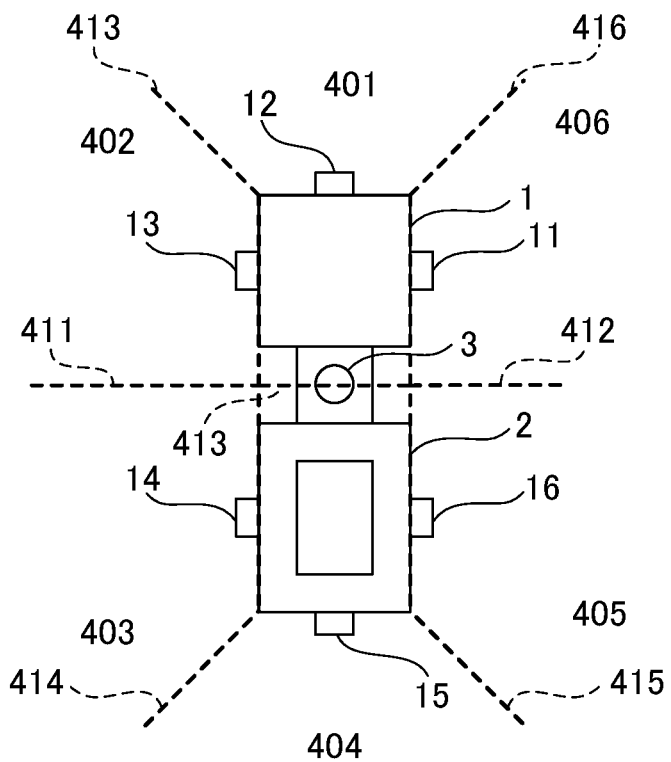
FIG. 4A and FIG. 4B are diagrams showing an example of a combination boundary of six images determined in step S303.
Figure 4B:
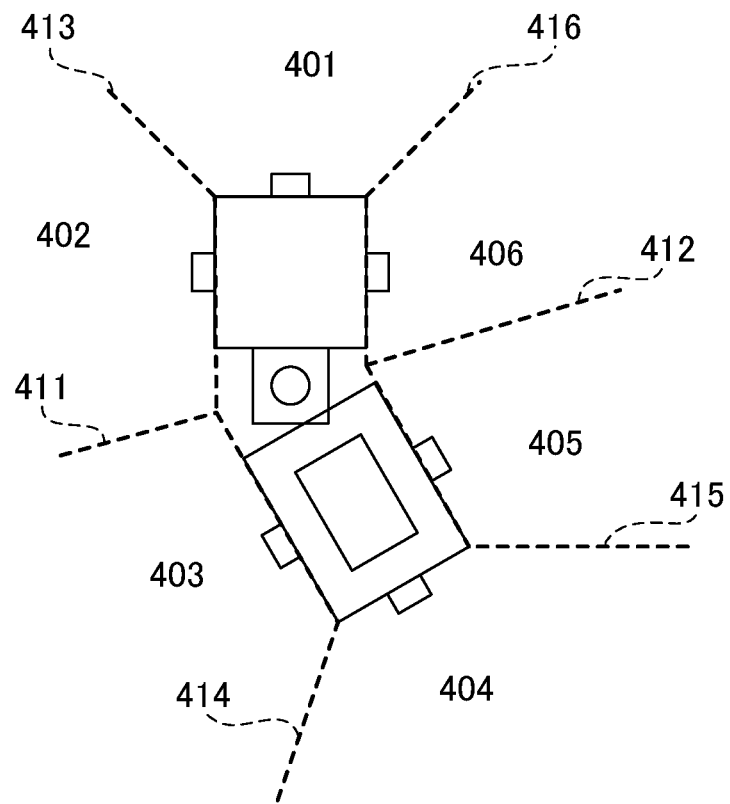

FIGS. 4A and 4B are diagrams showing an example of a combination boundary of the six images determined in step S303, and FIG. 4A is a diagram showing an example of a combination boundary at the time of creating a bird's-eye view image when a bending angle between a vehicle front portion 1 and a vehicle rear portion 2 is 0. The reference numeral 401 denotes a region imaged by the front camera 12 of the vehicle front portion 1 used for combining bird's-eye view images, and the reference numeral 402 denotes a region imaged by the left camera 13 of the vehicle front portion 1 used for combining bird's-eye view images.

The reference numeral 403 is a region imaged by the left camera 14 of the vehicle rear portion 2 used for combining bird's-eye view images, and the reference numeral 404 denotes a region imaged by the rear camera 15 of the vehicle rear portion 2 used for combining bird's-eye view images. The reference numeral 405 denotes a region imaged by the right camera 16 of the vehicle rear portion 2 used for combining bird's-eye view images, and the reference numeral 406 denotes a region imaged by the right camera 11 of the vehicle front portion 1 used for bird's-eye view images.

The reference numeral 411 denotes a combination boundary between an image captured by the left camera 13 of the vehicle front portion 1 and an image captured by the left camera 14 of the vehicle rear portion 2, and the reference numeral 412 denotes a combination boundary between an image captured by the right camera 11 of the vehicle front portion 1 and an image captured by the right camera 16 of the vehicle rear portion 2.

The reference numerals 413 and 414 respectively denote a combination boundary between images captured by the front camera 12 and the left camera 13 of the vehicle front portion 1 and a combination boundary between images captured by the left camera 14 and the rear camera 15 of the vehicle rear portion 2. The reference numerals 415 and 416 respectively denote a combination boundary between images captured by the rear camera 15 and the right camera 16 of the vehicle rear portion 2 and a combination boundary between images captured by the right camera 11 and the front camera 12 of the vehicle front portion 1.

As shown in FIG. 4A, when a bending angle between the vehicle front portion 1 and the vehicle rear portion 2 is 0, the combination boundary 411 between the images captured by the left cameras 13 and 14 of the vehicle front portion 1 and the vehicle rear portion 2 is, for example, vertical to a travel direction. A line 413 extending rightward from the combination boundary 411 passes through the center point of the connecting portion 3.

Similarly, the combination boundary 412 between the images captured by the right cameras 11 and 16 of the vehicle front portion 1 and the vehicle rear portion 2 is also perpendicular to the travel direction, and a line 413 extending rightward from the combination boundary 412 passes through the center point of the connecting portion 3.

FIG. 4B is a diagram showing an example of a combination boundary at the time of creating a bird's-eye view image when a bending angle between the vehicle front portion 1 and the vehicle rear portion 2 is other than 0. As shown in FIG. 4B, angles of the combination boundary 411 and the combination boundary 412 with respect to the travel direction are changed according to a bending angle between the vehicle front portion 1 and the vehicle rear portion 2.

Figure 5A:
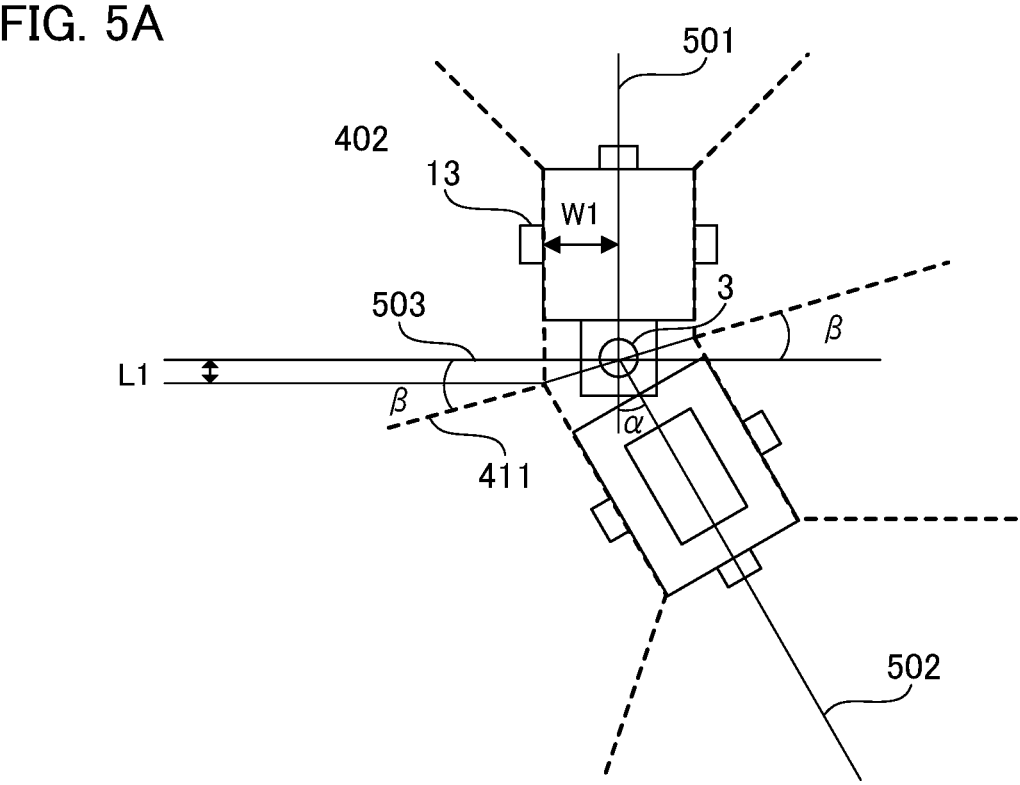
FIG. 5A and FIG. 5B are diagrams showing a method of calculating a combination boundary 411 on a left side when a bending angle between a vehicle front portion 1 and a vehicle rear portion 2 is α.
Figure 5B:
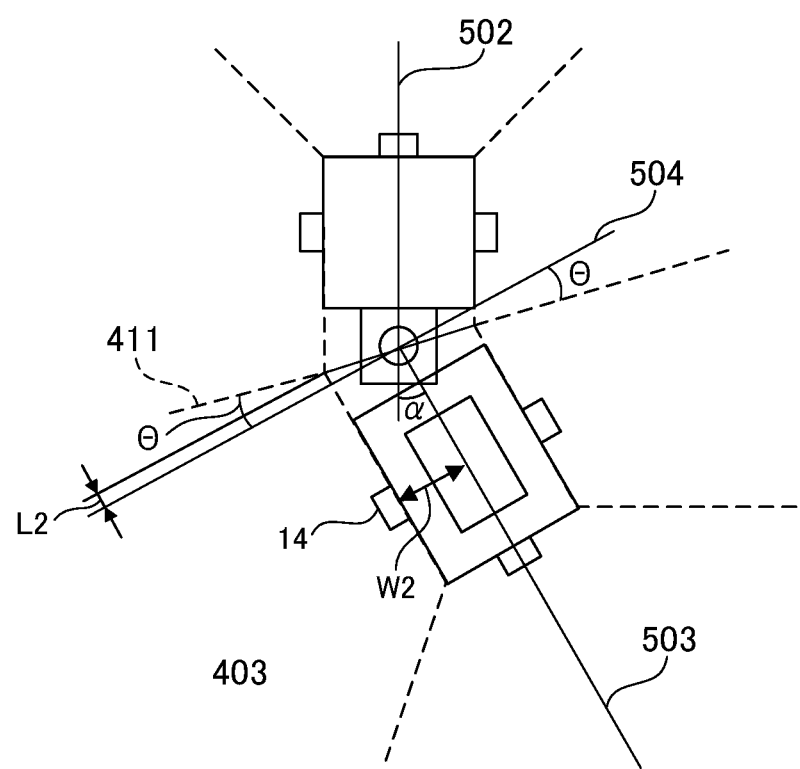

FIGS. 5A and 5B are diagrams showing a method of calculating the left combination boundary 411 when a bending angle between the vehicle front portion 1 and the vehicle rear portion 2 is a. FIG. 5A is a diagram for describing a method of calculating a range 402 used for creating a bird's-eye view image of an image captured by the left camera 13 of the vehicle front portion 1.

The reference numeral 501 denotes a line connecting the centers of the vehicle front portion 1 and the connecting portion 3, the reference numeral 502 denotes a line connecting the centers of the vehicle rear portion 2 and the connecting portion 3, and a bending angle between the vehicle front portion 1 and the vehicle rear portion 2 is α. The reference numeral 503 denotes a line perpendicular to the line 501 and passes through the center of the connecting portion 3.

First, an angle β between the line 503 and the combination boundary 411 is determined. As for the angle β, for example, β is half the angle β (α/2). W1 is a length in the lateral width direction of the vehicle front portion 1 from the left camera 13 of the vehicle front portion 1 to the center of the connecting portion 3. A value of W1 is determined when the camera 13 is attached to the vehicle front portion 1, and a value (coordinates) related to a position thereof is acquired in step S301 in FIG. 3.

When the angle β is determined, a value of L1 shown in FIG. 5A is obtained according to the following Equation 1.

$$L1 = W1 \times \tan \beta \qquad \text{(Equation 1)}$$

When the angle β and the value of L1 are determined, the combination boundary 411 is determined.

Figure 6A:
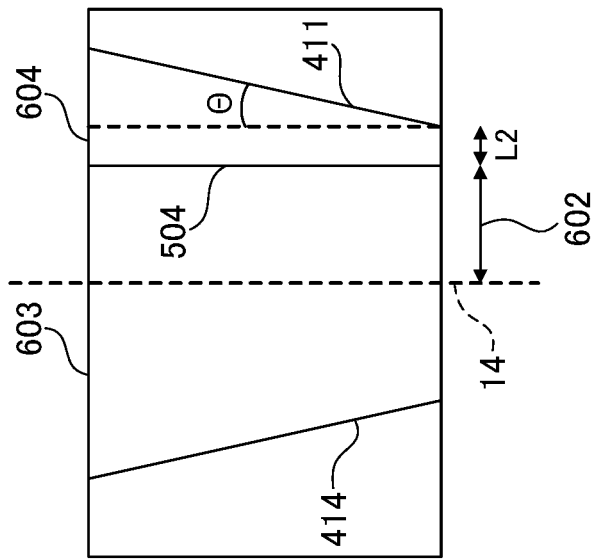
FIG. 6A and FIG. 6B are diagrams obtained through coordinate transformation centering on positions of cameras 13 and 14.
Figure 6B:
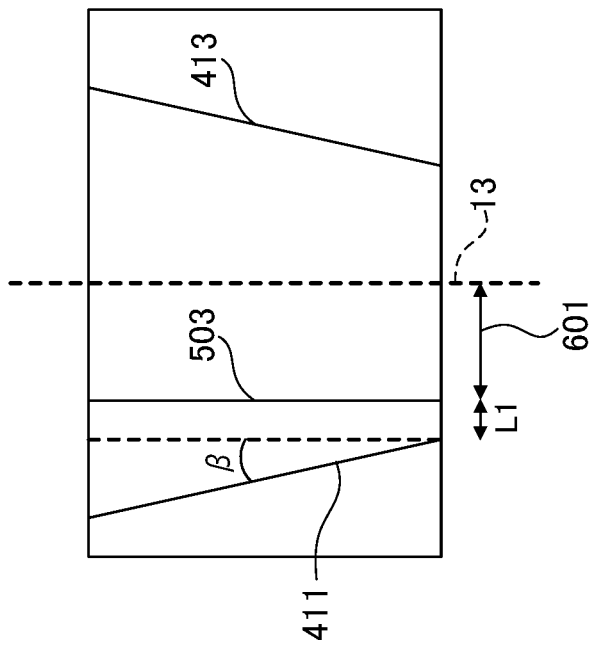

FIGS. 6A and 6B are diagrams obtained through coordinate transformation centering on the positions of the cameras 13 and 14, and FIG. 6A is a diagram obtained through coordinate transformation centering on the position of the camera 13. The reference numeral 601 denotes a length of the vehicle front portion 1 from the camera 13 to the center of the connecting portion 3 in the travel direction. The length 601 is determined when the camera 13 is attached.

In other words, since two values such as the length from the camera 13 to the combination boundary 411 (length 601+L1) and the tilt angle (β) of the combination boundary 411 with respect to the optical axis direction of the camera 13 are determined, coordinates of the combination boundary 411 can be obtained. When the coordinates of the combination boundary 411 can be obtained, it is possible to determine a range to be used for combining a bird's-eye view image in an image captured by the camera 13.

FIG. 5B is a diagram for describing a method of calculating a range 403 to be used for creating a bird's-eye view image of an image captured by the left camera 14 of the vehicle rear portion 2.

The reference numeral 504 denotes a line that passes through the center of the connecting portion 3 and is perpendicular to the travel direction of the vehicle rear portion 2. Assuming that an angle between the line 504 and the combination boundary 411 is Θ, a value of Θ is obtained from Equation 2 on the basis of values of the bending angle α and the angle β determined in FIG. 5A.

$$\Theta=\alpha-\beta \qquad \text{(Equation 2)}$$

W2 is a length in the lateral width direction of the vehicle rear portion 2 from the left camera 14 of the vehicle rear portion 2 to the center of the connecting portion 3. A value of W2 is determined when the camera 14 is attached, and the value is acquired in step S301 in FIG. 3.

When the angle Θ is determined, a value of L2 in FIG. 5B is obtained according to the following Equation 3.

$$L2=W2\times\tan\Theta \qquad \text{(Equation 3)}$$

When the angle Θ and the value of L2 are determined, a line of the combination boundary 411 for the camera 14 can be obtained according to an equation. As described above, when the angle β and the value of L1 are determined, the combination boundary 411 for the camera 13 is determined.

FIG. 6B is a diagram obtained through coordinate transformation centering on the position of the camera 14. The reference numeral 602 denotes a length of the vehicle front portion 1 from the camera 14 to the center of the connecting portion 3 in the travel direction. The length 602 is determined when the camera 14 is attached.

In other words, since two values such as the length from the camera 14 to the combination boundary 411 (the length of 602+L2) and the tilt angle (Θ) with respect to the camera 13 are determined, coordinates of the combination boundary 411 for the camera 14 can be obtained. When the coordinates of the combination boundary 411 can be obtained, it is possible to determine a range to be used for combining a bird's-eye view image in an image captured by the camera 14.

Figure 7A:
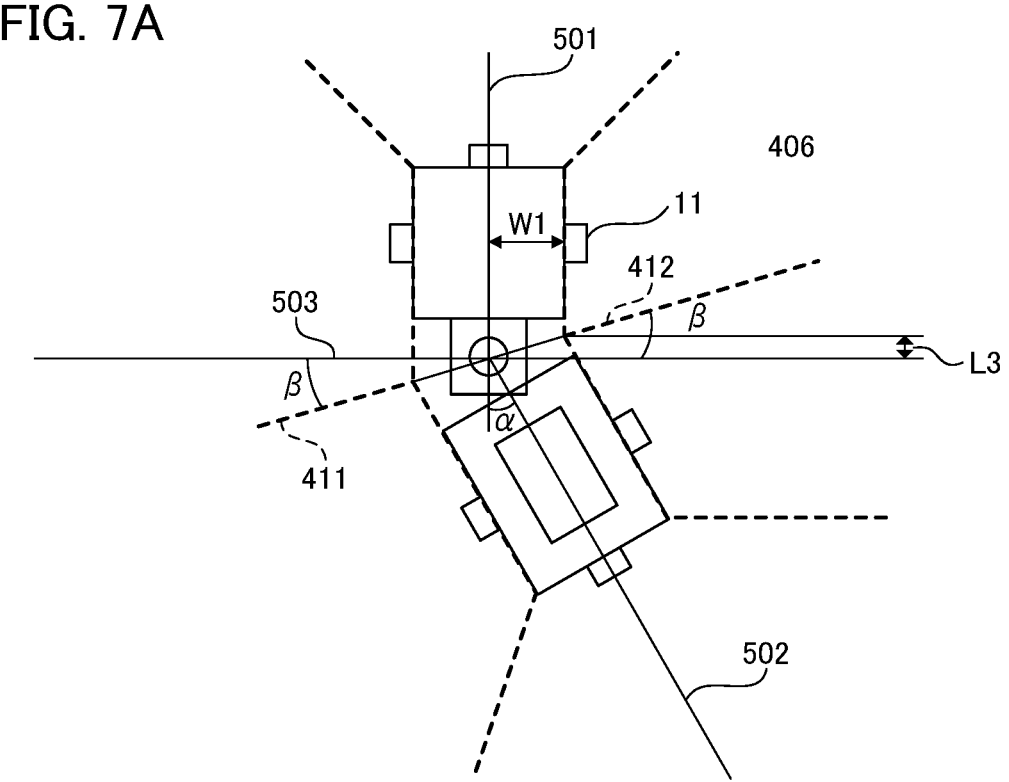
FIG. 7A and FIG. 7B are diagrams showing a method of calculating a combination boundary 412 on a right side when a bending angle between the vehicle front portion 1 and the vehicle rear portion 2 is α.
Figure 7B:
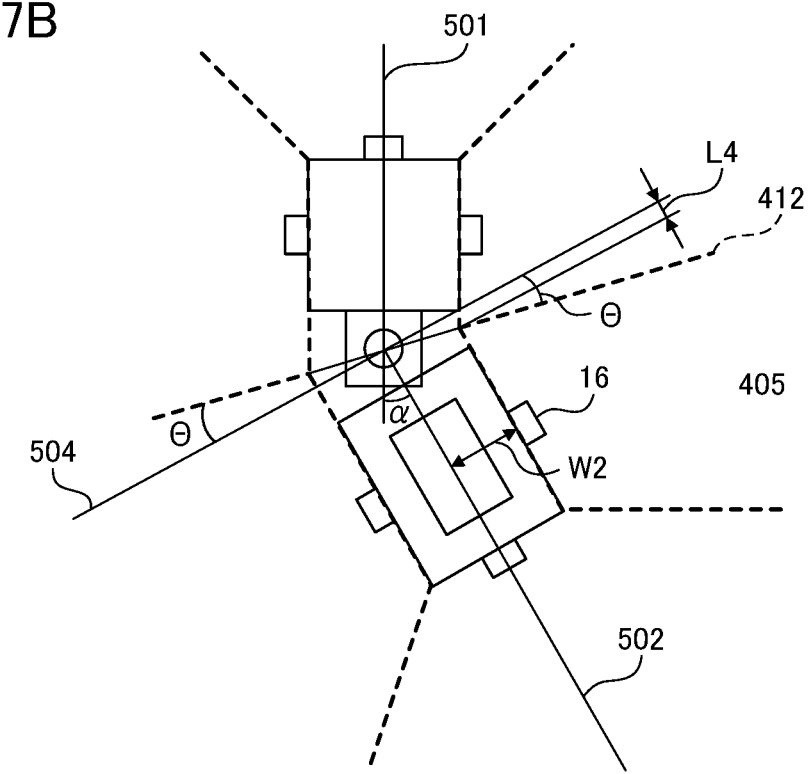

FIGS. 7A and 7B are diagrams showing a method of calculating the right combination boundary 412 when a bending angle between the vehicle front portion 1 and the vehicle rear portion 2 is a. FIG. 7A is a diagram for describing a method of calculating a range 406 used for creating a bird's-eye view image of an image captured by the right camera 11 of the vehicle front portion 1.

As in FIG. 5A, first, when an angle between the line 503 and the combination boundary 412 is set to β, a value of L3 in FIG. 7A may be calculated according to Equation 4.

$$L3=W1\times\tan\beta \qquad \text{(Equation 4)}$$

The above Equation 4 is the same as Equation 1 for calculating L1 calculated in FIG. 5A, and L3=L1 is established.

Figure 8A:
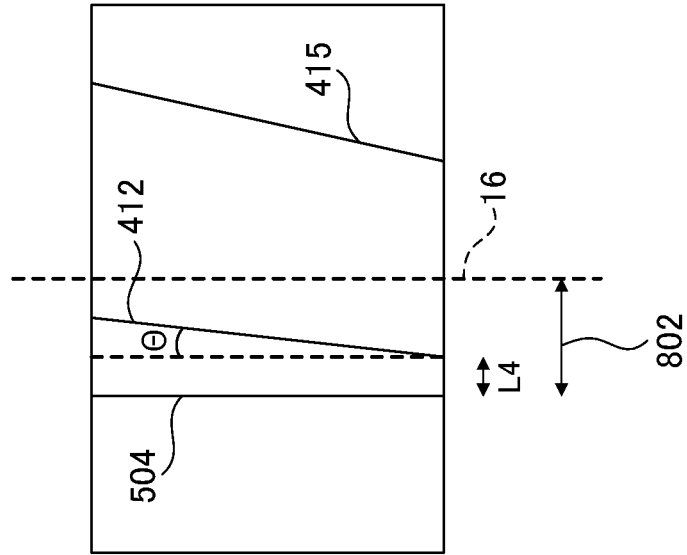
FIG. 8A and FIG. 8B are diagrams obtained through coordinate transformation centering on positions of cameras 11 and 16, respectively.
Figure 8B:
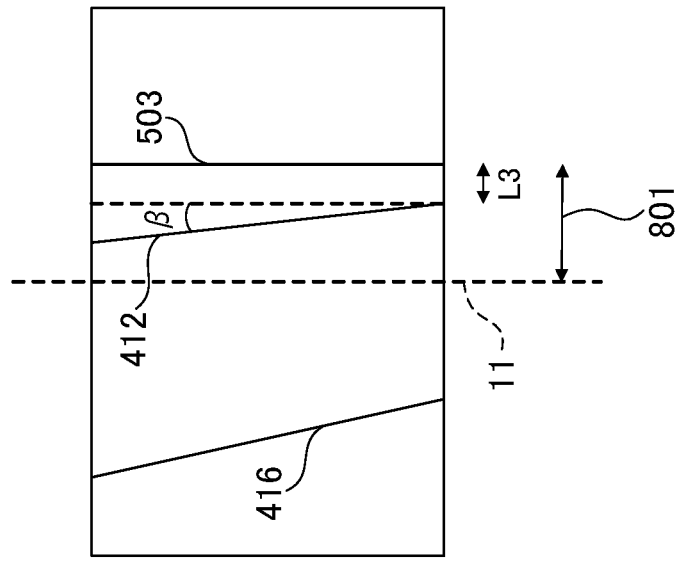

FIGS. 8A and 8B are diagrams obtained through coordinate transformation centering on positions of the cameras 11 and 16, respectively, and FIG. 8A is a diagram obtained through coordinate transformation centering on the position of the camera 11. The reference numeral 801 denotes a length of the vehicle front portion 1 from the camera 11 to the center of the connecting portion 3 in the travel direction. The length 801 is determined when the camera 14 is attached.

In other words, since two values such as the length from the camera 11 to the combination boundary 412 (the length of 801-L3) and the tilt angle (β) with respect to the camera 13 are determined, coordinates of the combination boundary 412 for the camera 11 can be obtained. When the coordinates of the combination boundary 412 can be obtained, it is possible to determine a range to be used for combining a bird's-eye view image in an image captured by the camera 11.

FIG. 7B is a diagram for describing a method of calculating a range 405 used for creating a bird's-eye view image of an image captured by the right camera 16 of the vehicle rear portion 2.

As in FIG. 5B, first, if an angle between the line 504 and the combination boundary 412 is Θ, a value of L4 shown in FIG. 7B may be calculated according to Equation 5.

$$L4=W2\times\tan\Theta \qquad \text{(Equation 5)}$$

The above Equation 5 is the same as Equation 2 for calculating L2 calculated in FIG. 5B, and L4=L2 is established.

FIG. 8B is a diagram obtained through coordinate transformation centering on a position of the camera 16. The reference numeral 802 denotes a length of the vehicle front portion 1 from the camera 16 to the center of the connecting portion 3 in the travel direction. The length 802 is determined when the camera 16 is attached.

In other words, since two values such as the length from the camera 16 to the combination boundary 412 (length 802-L4) and the tilt angle (Θ) of the combination boundary 412 with respect to the camera 13 are determined, coordinates of the combination boundary 412 for the camera 16 can be obtained. When the coordinates of the combination boundary 412 can be obtained, it is possible to determine a range to be used for combining a bird's-eye view image in an image captured by the camera 16.

Figure 9:
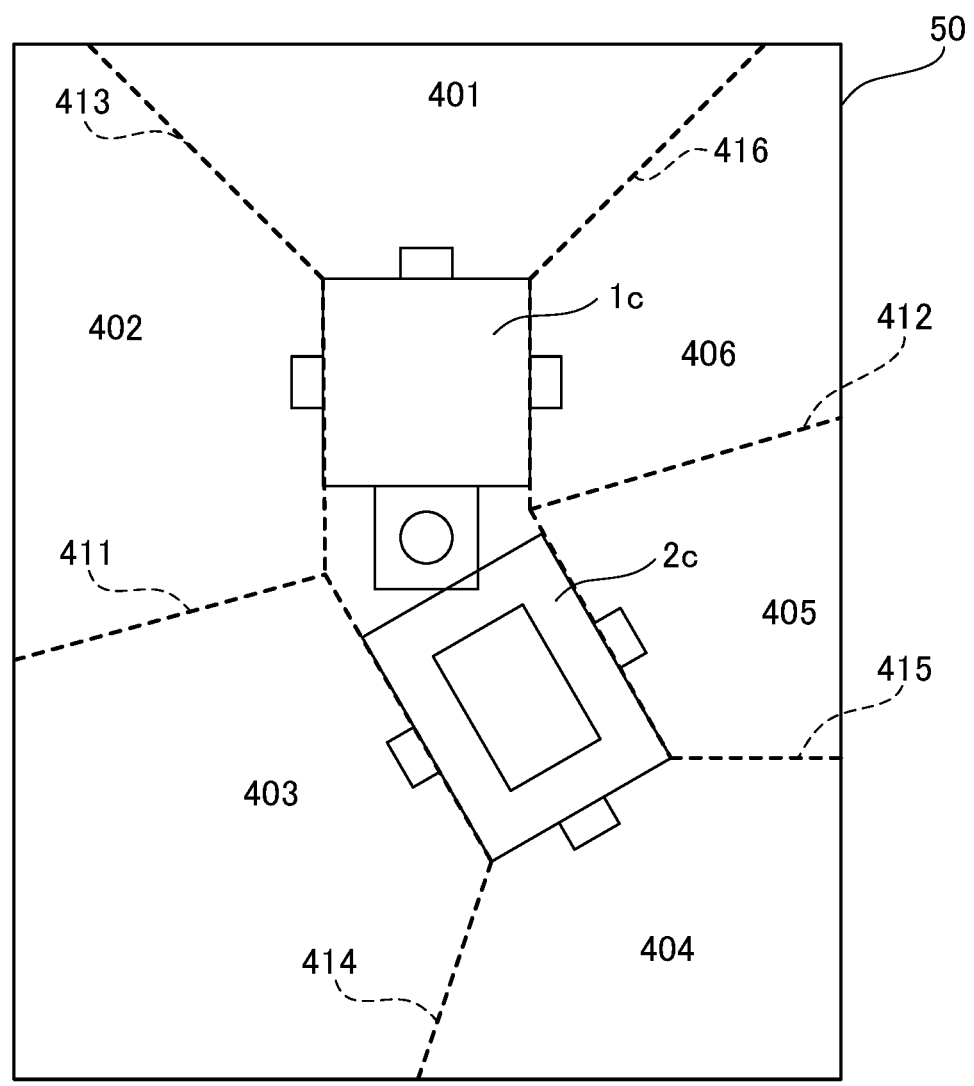
FIG. 9 is a diagram showing an example of a bird's-eye view image displayed on a display unit 50.

FIG. 9 is a diagram showing an example of a bird's-eye view image displayed on the display unit 50. The left combination boundary 411 and the right combination boundary 412 change according to a bending angle between the vehicle front portion 1 and the vehicle rear portion 2, as described above with reference to FIGS. 4 to 8. On the other hand, regarding the combination boundaries 413 to 416, a positional relationship of the cameras does not change regardless of a bending angle, the combination boundaries may be at the same angle at all times.

The reference numeral 1c denotes an image of a vehicle body representing the vehicle front portion and the reference numeral 2c denotes an image of the vehicle body representing the vehicle rear portion. Since the cameras 11 to 16 are provided on the outer surfaces the vehicle front portion 1 and the vehicle rear portion 2, the vehicle front portion 1 and the vehicle rear portion 2 are not captured in captured images. Therefore, an image of the vehicle body is superimposed on a bird's-eye view image and displayed.

In the First Embodiment, an example is described in which the combining unit 40d cuts out, joins, and combines viewpoint-converted images on the basis of combination boundaries to generate a bird's-eye view image, but the present invention is not limited thereto as long as a combination process is performed on the basis of a combination boundary.

For example, a bird's-eye view image may be generated by gradually switching one image to another image by performing weighted addition (alpha blending) on images within a predetermined distance range (in the vicinity of the boundary) from the combination boundary. That is, an image captured by the front portion imaging unit and an image captured by the rear portion imaging unit may be weighted and added in the vicinity of the combination boundary to be combined.

In that case, assuming that a predetermined distance range from the combination boundary is D, an alpha blending ratio (weighted addition coefficient) αi at any distance di from the combination boundary may be calculated according to the following Equation 6.

$$\alpha i=(D+di)/2D \quad \text{(Equation 6)}$$

Here, di is positive on the side closer to the optical axis than the combination boundary, and negative on the outside of the combination boundary. When di>D, αi=1, and when di<0, αi=0.

As described above, in the First Embodiment, since a combination boundary is changed according to a bending angle between the vehicle front portion 1 and the vehicle rear portion 2, it is possible to provide an image processing device for an articulated vehicle without gaps at joints.

When images captured by two cameras are combined, a range of an image captured by the front portion imaging unit and a range of an image captured by the rear portion imaging unit used for combination are changed according to a bending angle. Therefore, it is possible to display a bird's-eye view image without gaps at joints.

In the First Embodiment, a sensor such as an encoder installed in or around the connecting portion 3 detects a bending angle between the vehicle front portion 1 and the vehicle rear portion 2. However, the bending angle may be detected from an amount of operation of an operation unit such as a steering wheel for operating a movement direction, which is provided in the cab 4 of a movable apparatus. That is, an angle may be detected from an amount of operation of the operation unit for operating a direction of the movable apparatus.

A bending angle between the vehicle front portion 1 and the vehicle rear portion 2 may be detected by analyzing images captured by the cameras 11 to 16. For example, a method called a structure from motion (SfM) may be used to estimate the bending angle according to a method of estimating a position and attitude of a camera from images captured at a plurality of viewpoints.

Alternatively, there may be a configuration in which a feature point such as a white line is extracted from images captured by the left cameras 13 and 14 of the vehicle front portion 1 and the vehicle rear portion 2, and a bending angle between the vehicle front portion 1 and the vehicle rear portion 2 is detected (estimated) on the basis of an angle of the extracted feature point such as the white line. Of course, images captured by the right cameras 11 and 16 may be analyzed to estimate a bending angle.

As described above, when a bending angle is configured to be estimated through image recognition, a sensor such as an encoder is unnecessary, and thus it is possible to provide an inexpensive image processing device with a simple configuration. As for a method of SfM and image analysis, a known method may be used, and the description thereof is omitted here.

Second Embodiment

Figure 10:
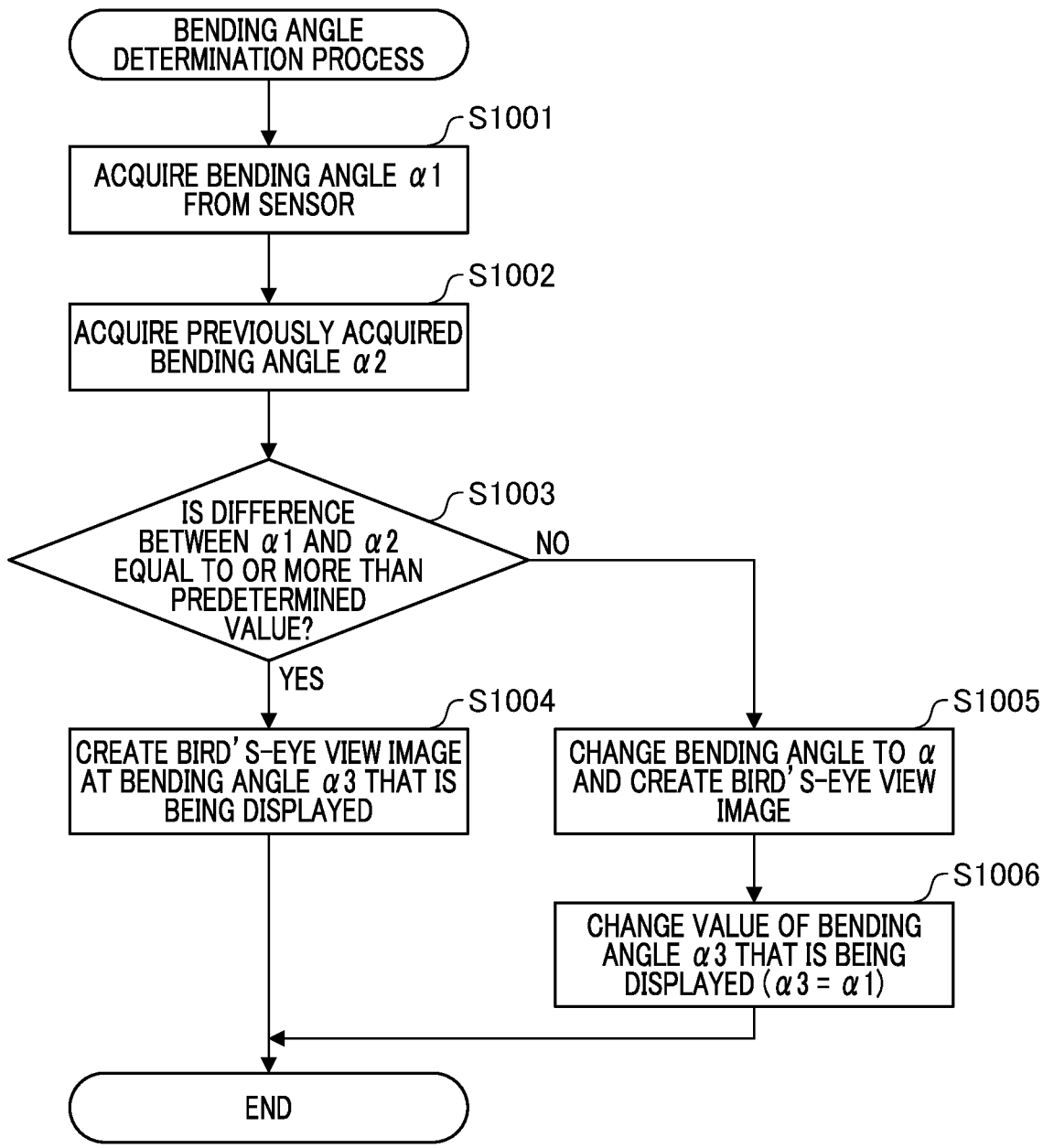
FIG. 10 is a flowchart showing an example of a process of determining a bending angle between a vehicle front portion 1 and a vehicle rear portion 2 when a bird's-eye view image is created in a Second Embodiment.

FIG. 10 is a flowchart showing an example of a process of determining a bending angle between the vehicle front portion 1 and the vehicle rear portion 2 when creating a bird's-eye view image in a Second Embodiment. An operation in each step in the flowchart of FIG. 10 is performed by a computer in the control unit 40 executing a computer program stored in a memory.

First, in step S1001, the CPU of the control unit 40 periodically acquires a bending angle α1 from a sensor such as an encoder provided in the bending angle detection unit 30. The acquired value of α1 is stored in the memory. Next, in step S1002, the CPU of the control unit 40 reads out, from the memory, a value of a bending angle α2 acquired from the bending angle detection unit 30 last time.

Next, the process proceeds to step S1003, and the CPU of the control unit 40 compares the bending angle α1 acquired in step S1001 with the previous bending angle α2 acquired in step S1002, and when a difference between α1 and α2 is a predetermined value or more, the process proceeds to step S1004. In step S1004, the CPU of the control unit 40 creates a bird's-eye view image on the basis of the same bending angle α3 as that of the currently displayed bird's-eye view image. The predetermined value in step S1003 is, for example, 5°, but is not limited to this.

On the other hand, if a difference between α1 and α2 is less than the predetermined value in step S1003, the process proceeds to step S1005, and the CPU of the control unit 40 creates a bird's-eye view image at the bending angle α1 acquired from the bending angle detection unit 30 in step S1001. Then, in step S1006, the value of the bending angle α3 of the currently displayed bird's-eye view image is rewritten to the bending angle α1 and stored in the memory.

As described above, when the change in the bending angle is greater than or equal to the predetermined value, control is performed so that the combination boundary is not changed. Therefore, even if the bending angle suddenly changes, the bending angle in the displayed bird's-eye view image does not change abruptly, and discomfort does not occur.

Third Embodiment

Figure 11:
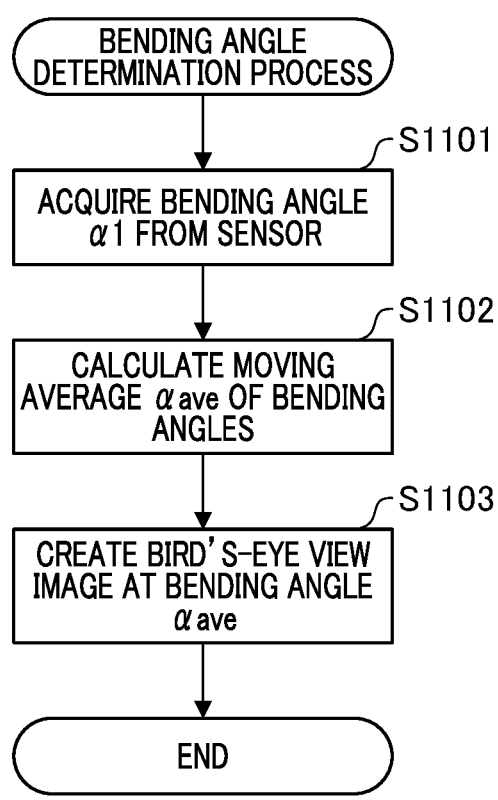
FIG. 11 is a flowchart showing an example of a process of determining a bending angle between a vehicle front portion 1 and a vehicle rear portion 2 when a bird's-eye view image is created in a Third Embodiment.

FIG. 11 is a flowchart showing an example of a process of determining a bending angle between the vehicle front portion 1 and the vehicle rear portion 2 when creating a bird's-eye view image in a Third Embodiment. An operation in each step in the flowchart of FIG. 11 is performed by a computer in the control unit 40 executing a computer program stored in a memory.

First, in step S1101, the CPU of the control unit 40 acquires a bending angle α1 from a sensor such as an encoder provided in the bending angle detection unit 30, and stores the bending angle α1 in the memory. As a value of the bending angle α1, values for the past X times are stored in the memory. Then, in step S1102, the CPU of the control unit 40 calculates a moving average cave from the bending angles for the past X times. A value of X is, for example, 10, but is not limited to this.

Next, the process proceeds to step S1103, and the CPU of the control unit 40 determines a combination boundary with a bending angle between the vehicle front portion 1 and the vehicle rear portion 2 as cave, and creates a bird's-eye view image.

As described above, by calculating a boundary on the basis of an average value of bending angles detected a plurality of times, it is possible to smoothly display a bent portion of a bird's-eye view image.

Fourth Embodiment

Figure 12:
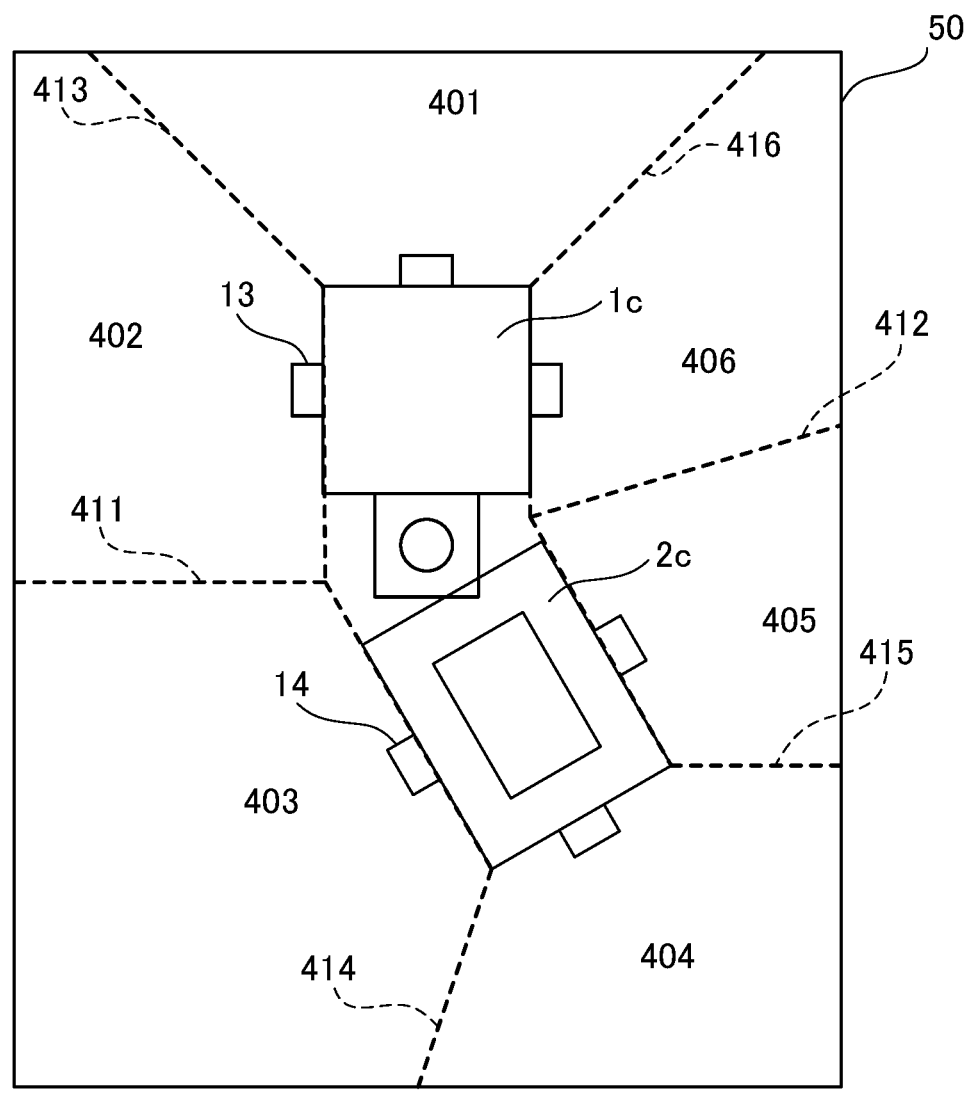
FIG. 12 is a diagram showing examples of a bird's-eye view image and a combination boundary displayed on a display unit 50 in a Fourth Embodiment.

FIG. 12 is a diagram showing examples of a bird's-eye view image and a combination boundary displayed on the display unit 50 in a Fourth Embodiment. The reference numeral 411 denotes a combination boundary between a range 402 of an image captured by the left camera 13 of the vehicle front portion 1 and a range 403 of an image captured by the left camera 14 of the vehicle rear portion 2.

Compared with the bird's-eye view image shown in FIG. 9 described in the First Embodiment, the range 403 of the image captured by the left camera 14 of the vehicle rear portion 2 uses a wider region when a bird's-eye view image is created.

In the First Embodiment, all cameras 11 to 16 are the same. However, if the lens of the left camera 14 of the vehicle rear portion 2 has a higher resolution than the lens of the left camera 13 of the vehicle front portion 1, as shown in FIG. 12, an image captured with the lens having a higher resolution preferentially uses a wider region when a bird's-eye view image is created.

That is, an angle of view of an image captured with a high-resolution lens is made wider than an angle of view of an image captured with a low-resolution lens.

Conversely, if a lens provided in the left camera 13 of the vehicle front portion 1 has a higher resolution than a lens provided in the left camera 14 of the vehicle rear portion 2, the combination boundary 411 is determined such that a region imaged by the left camera 13 of the vehicle front portion 1 is used more widely.

Instead of determining the combination boundary 411 on the basis of a resolution of a lens, the combination boundary 411 may be determined on the basis of a difference in a resolution of an imaging element provided in the camera. For example, if the left camera 14 of the vehicle rear portion 2 has a higher resolution of an imaging element than that of the left camera 13 of the vehicle front portion 1, as shown in FIG. 12, a bird's-eye view image may be created such that an angle of view of the range 403 of an image captured by the left camera 14 of the vehicle rear portion 2 is wider.

As described above, a resolution of the front portion imaging unit and a resolution of the rear portion imaging unit are compared, and a combination boundary is calculated such that an angle of view of an image captured by an imaging unit with a higher resolution is larger than an angle of view of an image captured by an imaging unit with a lower resolution. Therefore, a bird's-eye view image with a higher resolution can be displayed.

In the above-described embodiments, an example in which the image processing device is mounted in a movable apparatus such as a vehicle has been described. However, a movable apparatus in the above embodiments is not limited to a vehicle such as an automobile, and may be any of movable apparatus such as trains, ships, airplanes, robots, and drones. In addition, at least a part of the image processing device of the above-mentioned embodiments may be mounted on such a movable apparatus.

It should be noted that the image processing device in the above embodiments also includes a device that is disposed at a location separate from a movable apparatus and remotely controls the movable apparatus.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing device through a network or various storage media. Then, a computer (or a CPU, an MPU, or the like) of the image processing device may be configured to read and execute the program. In such a case, the program and the storage medium storing the program configure the present invention.

This application claims the benefit of Japanese Patent Application No. 2022-052234, filed on Mar. 28, 2022, which is hereby incorporated by reference herein in its entirety.

What is claimed is:

1. An image processing device comprising:
  at least one processor or circuit configured to function as a plurality of units comprising:
  (1) an angle detection unit configured to detect an angle between a front portion of a movable apparatus and a rear portion of the movable apparatus;
  (2) a combining unit configured to combine (a) an image captured by a front portion imaging unit provided at the front portion and (b) an image captured by a rear portion imaging unit provided at the rear portion; and
  (3) a boundary calculation unit configured to calculate a boundary between the images combined in the combining unit on the basis of the angle,
  wherein the boundary calculation unit (a) compares a resolution of the front portion imaging unit and a resolution of the rear portion imaging unit, and (b) calculates the boundary such that an angle of view of an image captured by an imaging unit with a higher resolution is larger than an angle of view of an image captured by an imaging unit with a lower resolution.

2. The image processing device according to claim 1, wherein the at least one processor or circuit is further configured to function as:
  a viewpoint conversion unit configured to convert viewpoints of the images.

3. The image processing device according to claim 1, wherein the angle detection unit includes a sensor provided in or around a connecting portion that connects the front portion and the rear portion.

4. The image processing device according to claim 1, wherein the angle detection unit detects the angle from an operation amount of an operation unit for operating a direction of the movable apparatus.

5. The image processing device according to claim 1, wherein the angle detection unit extracts feature points from the image captured by the front portion imaging unit and the rear portion imaging unit, and detects the angle on the basis of the extracted feature points.

6. The image processing device according to claim 5, wherein the angle detection unit detects the angle by using SfM (Structure from Motion).

7. The image processing device according to claim 1, wherein the combining unit changes a range of the image captured by the front portion imaging unit and a range of the image captured by the rear portion imaging unit according to the angle, the ranges being used for combining the images.

8. The image processing device according to claim 1, wherein the boundary calculation unit does not change the boundary if a change in the angle is equal to or more than a predetermined value.

9. The image processing device according to claim 1, wherein the boundary calculation unit calculates the boundary on the basis of an average value of angles detected a respective plurality of times.

10. The image processing according to claim 1, wherein the combining unit combines the image captured by the front portion imaging unit and the image captured by the rear portion imaging unit by performing weighted addition.

11. The image processing device according to claim 1, wherein the at least one processor or circuit is further configured to function as:

a display unit configured to display an image obtained by combining the images in the combining unit.

12. The image processing device according to claim 3, wherein the angle detection unit includes a sensor provided in a connecting portion that connects the front portion and the rear portion.

13. A vehicle comprising the image processing device according to claim 1, and the movable apparatus.

14. The vehicle according to claim 13, wherein in the movable apparatus, a connecting portion connects the front portion and the rear portion.

15. The vehicle according to claim 14, wherein the front portion and the rear portion are rotatable around the connecting portion.

16. The vehicle according to claim 15, wherein the angle detection unit includes a sensor disposed between the front portion and the rear portion.

17. The vehicle according to claim 15, wherein the angle detection unit detects the angle from an operation amount of an operation unit for operating a direction of the movable apparatus.

18. The vehicle according to claim 15, wherein the front portion imaging unit comprises a camera including (a) an imaging element and (b) an optical system that forms an optical image on a light receiving surface of the imaging element, the optical system including a lens, wherein the rear portion imaging unit comprises a camera including (a) an imaging element and (b) an optical system that forms an optical image on a light receiving surface of the imaging element, the optical system including a lens, and wherein (1) the angle detection unit comprises a sensor including an encoder or (2) the angle detection unit detects the angle from an operation amount of an operation unit for operating a direction of the movable apparatus or (3) the angle detection unit detects the angle by analyzing images.

19. An image processing method comprising:

detecting an angle between a front portion of a movable apparatus and a rear portion of the movable apparatus;

combining (a) an image captured by a front portion imaging unit provided at the front portion and (b) an image captured by a rear portion imaging unit provided at the rear portion; and calculating a boundary between the images combined in the combining on the basis of the angle, wherein the calculating the boundary comprises (a) comparing a resolution of the front portion imaging unit and a resolution of the rear portion imaging unit, and (b) calculating the boundary such that an angle of view of an image captured by an imaging unit with a higher resolution is larger than an angle of view of an image captured by an imaging unit with a lower resolution.

20. A non-transitory computer-readable storage medium configured to store a computer program comprising instructions for executing processes, the processes comprising:

detecting an angle formed between a front portion of a movable apparatus and a rear portion of the movable apparatus;

combining (a) an image captured by a front portion imaging unit provided at the front portion and (b) an image captured by a rear portion imaging unit provided at the rear portion; and calculating a boundary between the images combined in the combining on the basis of the angle, wherein the calculating the boundary comprises (a) comparing a resolution of the front portion imaging unit and a resolution of the rear portion imaging unit, and (b) calculating the boundary such that an angle of view of an image captured by an imaging unit with a higher resolution is larger than an angle of view of an image captured by an imaging unit with a lower resolution.

* * * * *